(12) United States Patent
Simmonds

(10) Patent No.: US 8,965,152 B2
(45) Date of Patent: Feb. 24, 2015

(54) WAVEGUIDES

(75) Inventor: Michael David Simmonds, Rochester (GB)

(73) Assignee: Bae Systems PLC, London (GB)

( * ) Notice: Subject to any disclaimer, the term of this patent is extended or adjusted under 35 U.S.C. 154(b) by 792 days.

(21) Appl. No.: 13/133,278

(22) PCT Filed: Dec. 9, 2009

(86) PCT No.: PCT/GB2009/051676
§ 371 (c)(1),
(2), (4) Date: Jun. 7, 2011

(87) PCT Pub. No.: WO2010/067114
PCT Pub. Date: Jun. 17, 2010

(65) Prior Publication Data
US 2011/0242661 A1    Oct. 6, 2011

(30) Foreign Application Priority Data

Dec. 12, 2008  (EP) .................................. 08275084
Dec. 12, 2008  (GB) ................................. 0822685.4

(51) Int. Cl.
*G02B 6/26* (2006.01)
*G02B 5/18* (2006.01)
(Continued)

(52) U.S. Cl.
CPC .......... *G02B 27/1006* (2013.01); *G02B 6/0035* (2013.01); *G02B 6/0068* (2013.01);
(Continued)

(58) Field of Classification Search
USPC ...................... 385/27, 14–15, 37; 359/13–15, 359/563–576, 618, 630–633
See application file for complete search history.

(56) References Cited

U.S. PATENT DOCUMENTS 5,453,877 A * 9/1995 Gerbe et al. .................. 359/633
5,544,268 A * 8/1996 Bischel et al. ..................... 385/4
(Continued)

FOREIGN PATENT DOCUMENTS

WO          99/52002 A1   10/1999
WO          03/081320 A   10/2003
(Continued)

OTHER PUBLICATIONS

Search Report in related European application No. 08275084 mailed Jun. 16, 2009.
(Continued)

*Primary Examiner* — Ryan Lepisto
*Assistant Examiner* — Guy Anderson
(74) *Attorney, Agent, or Firm* — Finch & Maloney PLLC

(57) ABSTRACT

A projection display 210 arranged to display an image to an observer 212 use waveguide techniques to generate a display defining a large exit pupil at the point of the observer 212 and a large field of view, while using a small image-providing light source device. The projection display 210 uses two parallel waveguides 214, 216 made from a light transmissive material. One waveguide 214 stretches the horizontal pupil of the final display and the other waveguide 216 stretches the vertical pupil of the final display and acts as a combiner through which the observer 212 views an outside world scene 220 and the image overlaid on the scene 220. In a color display, each primary color is transmitted within a separate channel R, G, B.

15 Claims, 4 Drawing Sheets

(51) Int. Cl.
*G02B 27/10* (2006.01)
*F21V 8/00* (2006.01)
*G02B 27/01* (2006.01)
*G02B 27/14* (2006.01)
*G02B 6/00* (2006.01)

(52) U.S. Cl.
CPC ........ *G02B27/0101* (2013.01); *G02B 27/1086* (2013.01); *G02B 27/145* (2013.01); *G02B 5/18* (2013.01); *G02B 6/00* (2013.01); *G02B 6/0076* (2013.01); *G02B 2027/0125* (2013.01)
USPC .................. 385/27; 385/14; 385/15; 385/37; 359/13; 359/14; 359/15; 359/563; 359/564; 359/565; 359/570; 359/571; 359/572; 359/573; 359/618; 359/630; 359/631; 359/632; 359/633

(56) References Cited

U.S. PATENT DOCUMENTS

| | | | | |
|---|---|---|---|---|
| 5,581,378 | A * | 12/1996 | Kulick et al. | 359/9 |
| 5,596,671 | A * | 1/1997 | Rockwell, III | 385/147 |
| 5,724,463 | A * | 3/1998 | Deacon et al. | 385/27 |
| 5,841,919 | A * | 11/1998 | Akiba et al. | 385/37 |
| 6,169,613 | B1 * | 1/2001 | Amitai et al. | 359/15 |
| 6,832,037 | B2 * | 12/2004 | Aylward et al. | 385/145 |
| 7,205,960 | B2 * | 4/2007 | David | 345/7 |
| 7,418,170 | B2 * | 8/2008 | Mukawa et al. | 385/31 |
| 7,697,750 | B2 * | 4/2010 | Simmons | 382/154 |
| 7,747,113 | B2 * | 6/2010 | Mukawa et al. | 385/31 |
| 2002/0181067 | A1 * | 12/2002 | Romanovsky et al. | 359/245 |
| 2005/0201705 | A1 * | 9/2005 | Ellwood | 385/129 |
| 2006/0132914 | A1 * | 6/2006 | Weiss et al. | 359/462 |
| 2006/0228073 | A1 * | 10/2006 | Mukawa et al. | 385/31 |
| 2006/0244907 | A1 * | 11/2006 | Simmons | 351/162 |
| 2007/0242327 | A1 * | 10/2007 | Powell et al. | 359/197 |
| 2007/0273957 | A1 * | 11/2007 | Zalevsky et al. | 359/326 |

FOREIGN PATENT DOCUMENTS

| | | |
|---|---|---|
| WO | 2004109349 A2 | 12/2004 |
| WO | 2006064325 A1 | 6/2006 |
| WO | 2007029032 A1 | 3/2007 |
| WO | 2007029034 A1 | 3/2007 |
| WO | 2007036936 A1 | 4/2007 |

OTHER PUBLICATIONS

International Search Report in related application PCT/GB2009/051676 mailed May 18, 2010.

Search Report in related British application No. 0822685.4 mailed Mar. 30, 2009.

International Preliminary Report on Patentability related application PCT/GB2009/051676 mailed Jun. 23, 2011.

* cited by examiner

WAVEGUIDES

CROSS REFERENCE TO RELATED APPLICATIONS

This is the U.S. National Phase of PCT/GB2009/051676, filed Dec. 9, 2009, which claims priority to British Patent Application No. 0822685.4, filed Dec. 12, 2008 and European Patent Application No 08275084.5 filed Dec. 12, 2008, each of which are incorporated by reference herein in their entireties.

This invention relates to a waveguide and a projection display for displaying an image to an observer, which is particularly, but not exclusively, suitable for use in a head up display, a helmet mounted display or head mounted display.

Referring to FIGS. 1 and 2, wherein like references have been used to indicate similar integers, prior art International patent application publication number WO2007/029032 teaches a projection display 10 for displaying an image to an observer 12 that uses waveguide techniques to generate a collimated display defining a large exit pupil at the point of the observer 12 and a large field of view, whilst using a small image-providing light source device. The projection display 10 uses a first plate-like waveguide 14 made of light transmissive material such as glass or plastic and a second plate-like waveguide 16 made from a light transmissive and light transparent material such as glass or plastic. The projection display 10 additionally includes an image-providing light source device, not shown, located to inject image bearing light into the first plate-like waveguide 14 through a first face 18.

The image-providing light source device includes a micro-display arranged to provide information to be displayed to the observer 12. Additionally the image-providing light source device includes a collimating optical arrangement located between the micro-display and the first face 18 of the first plate-like waveguide 14. The collimating optical arrangement is operable to collimate light received from the micro-display and to inject the collimated image bearing light into the first plate-like waveguide 14 through the first face 18.

The collimated image bearing light produced by the collimating optical arrangement has a small exit pupil and is fed into the first plate-like waveguide 14, which performs the function of stretching the horizontal pupil of the final display. The output from the first plate-like waveguide 14 is fed into the second plate-like waveguide 16, which is arranged to stretch the vertical pupil of the final display and also to act as a combiner for the projection display 10 through which the observer 12 views an outside world scene 20 along a line of sight 22 of the observer 12 through the second plate-like waveguide 16 with information to be displayed to the observer 12 overlaid on the outside world scene 20. In this manner, the image to be displayed to the observer 12 looking through the second plate-like waveguide 16 defines a large exit pupil and a large field of view whilst using a small image generating light source.

Image bearing light injected into the first plate-like waveguide 14, via first face 18 is incident on a first grating 24 arranged internally within the first plate-like waveguide 14 and substantially parallel with the first face 18. Light impinging on the first grating 24 diffracts therefrom such that the incidence angle of the light on the internal surfaces of the first plate-like waveguide 14 is greater than the critical angle for the material from which the first plate-like waveguide 14 is made. The image bearing light is constrained within the first plate-like waveguide 14 to propagate along the first plate-like waveguide 14 reflecting from each internal surface in turn to follow a predefined light path 26. Thus, the relative field angles of the light incident on the first plate-like waveguide 14 at the first face 18 are preserved within the first plate-like waveguide 14 and the information required to regenerate the original image is preserved.

The first grating 24 also serves to radiate the image bearing light out of the first plate-like waveguide 14. The first grating 24 is a low efficiency grating which diffracts a small amount of light out of the first plate-like waveguide 14 on each interaction with incident image bearing light.

The second plate-like waveguide 16 is located with a first face 28 parallel with a second face 30 of the first plate-like waveguide 14 and is arranged to receive the image bearing light exiting the second face 30 of the first plate-like waveguide 14. The second face 30 is parallel to the first face 18 of the first plate-like waveguide 14. The first face 28 of the second plate-like waveguide 16 is located adjacent and close to the second face 30 of the first plate-like waveguide 14. The second plate-like waveguide 16 includes a second grating 32 located therein arranged substantially parallel to the first face 28 of the second plate-like waveguide 16 and the second grating 32 is operable to diffract each impinging ray of image bearing light received from the first grating 24 of the first plate-like waveguide 14 at an angle that is larger than the critical angle for the material from which the second plate-like waveguide 16 is made. Accordingly, received image bearing light will propagate inside the second plate-like waveguide 16 to follow the predefined light path 26. The image bearing light continues along the light path 26 to a third grating 34 arranged on or within the second plate-like waveguide 16, which is arranged to diffract the received image bearing light out of the second plate-like waveguide 16 towards the observer 12.

The second grating 32 is arranged such that its diffractive power is rotated through 90 degrees to that of the diffractive power of the parallel first grating 24 to rotate incident image bearing light towards the third grating 34.

The third grating 34 is a low efficiency grating, such that as image bearing light propagates along the light path 26 within the second plate-like waveguide 16, each interaction with the third grating 34 causes a small proportion of the image bearing light to be diffracted out of the second plate-like waveguide 16. Image bearing light which is not diffracted out of the second plate-like waveguide 16 continues to propagate within the second plate-like waveguide 16. Accordingly, a large number of parallel rays of image bearing light exit the second plate-like waveguide 16 through the third grating 34 towards the observer 12, which originated at discrete points on the micro-display forming the image generating light source device. As the relative field angles of the image bearing light have been preserved within the first and second plate-like waveguides 14, 16, the correct image to be conveyed to the observer 12 is presented for viewing when the observer 12 views an outside world scene 20 through the second plate-like waveguide 16.

Such a projection display 10 is only arranged to present a single colour image to the observer 12.

According to a first aspect of the invention a waveguide apparatus, including: a substrate of light transmissive material; at least one layer arranged within the substrate of material, the layer being arranged to define separate channels within the substrate of material, the channels being arranged to transmit light of respective predefined wavelengths under total internal reflection, wherein each grating is arranged to diffract a portion of light incident thereon out of the substrate of material and to allow the remainder of the light incident thereon to be transmitted in its associated channel under total internal reflection.

In this manner, image bearing light injected into the substrate of material is maintained in separation dependent on wavelength, which may be according to its primary colours, for example red, green and blue wavelengths of light, and the image bearing light within each channel is transmitted by total internal reflection within the substrate of material. Accordingly, image bearing light of different wavelengths can be transmitted in separate channels within the substrate, each channel being optimised to transmit a particular wavelength of image bearing light, thereby mitigating chromatic dispersion or colour unevenness associated with injecting image bearing light of a wide wavelength into a single channel prior art projection display.

Each channel may be arranged to transmit light of a predefined wavelength or range of wavelengths. For example, and as indicated above, the channels may be configured to transmit light in red, green and blue wavelengths. Alternatively, the channels could be configured to transmit light in yellow, red and blue wavelengths. The arrangement can provide chromatically separated light transmission across three different colour bands which when reconstituted into a final image displayed to a viewer can reproduce a full optical spectrum by combining different proportions of the chromatically separated light. Whilst light may be separated into the three distinct colours, alternatively light may be separated into a number of separate wavelength ranges, for example, "red" in the range of 590 to 750 nm, "green" in the range 495 and 590 nm, and "blue" in the range 380 and 495 nm.

A first channel may be arranged to carry the red wavelength of light, a second channel may be arranged to arranged to carry the green wavelength of light and a third channel may be arranged to carry the blue wavelength of light.

At least one filter may be arranged to separate light dependent on wavelength prior to transmission within a channel. At least one filter may be carried on or within the substrate of material.

Alternatively, light may be separated dependent on wavelength prior to injection into the substrate of material.

Each grating may be arranged to diffract light out of the substrate of material the light being substantially parallel with light diffracted out of the substrate of material by each other grating within another channel.

The grating may be a holographic optical element.

The channels may have respective optical elements for injecting image bearing light into the channels, wherein the optical elements are configured for injecting image bearing light only within respective said predefined wavelengths into the channels and allowing image bearing light outside of those respective predefined wavelengths to pass therethrough. The arrangement separates image bearing into component wavelengths and injects those separate wavelengths into the respective channel.

According to another aspect of the invention a projection display, for displaying an image to an observer includes a first waveguide element arranged to be light transmissive, an image-providing light source device arranged to generate an image and to inject image bearing light into the first waveguide element, the first waveguide element being arranged to direct the image bearing light internally along the first waveguide element and through which the image bearing light is outputted from the first waveguide element, a second waveguide element arranged to be light transmissive and transparent and is arranged to receive the image bearing light from the first waveguide element and to direct the image bearing light along the second waveguide element, the second waveguide element is further arranged to output image bearing light from the second waveguide element towards an observer, and wherein the first waveguide element includes a substrate of material having at least one layer arranged within the substrate of material, the layer being arranged to define separate channels within the substrate of material, the channels being arranged to transmit light in respective predefined wavelengths under total internal reflection and a first grating associated with each channel, wherein each first grating is arranged to diffract a portion of light incident thereon out of the substrate of material and to allow the remainder of the light incident thereon to be transmitted in its associated channel under total internal reflection, wherein the second waveguide element includes a substrate of material having at least one layer arranged within the substrate of material, the layer being arranged to define separate channels within the substrate of material the channels being arranged to transmit light in respective predefined wavelengths under total internal reflection and a second grating associated with each channel, wherein each second grating is arranged to diffract light incident thereon to be transmitted in its associated channel under total internal reflection, and wherein the second waveguide element also includes a third grating associated with each channel, wherein each third grating is arranged to diffract a portion of light incident thereon out of the substrate of material towards the observer and to allow the remainder of the light incident thereon to be transmitted in its associated channel under total internal reflection.

In this manner, image bearing light injected into the first waveguide element is maintained in separation dependent on wavelength, for example red, green and blue wavelengths of light, and the image bearing light is transmitted by total internal reflection within a separate channel in both the first and the second waveguides dependent on the wavelength of the image bearing light. Accordingly, a colour field of view of the image can be conveyed to an observer. Each channel of the first and second waveguides can be optimised to transmit a particular wavelength of image bearing light, thereby mitigating chromatic dispersion or colour unevenness.

The invention will now be described, by way of example only, with reference to the accompanying drawings, in which.

Figure 1:
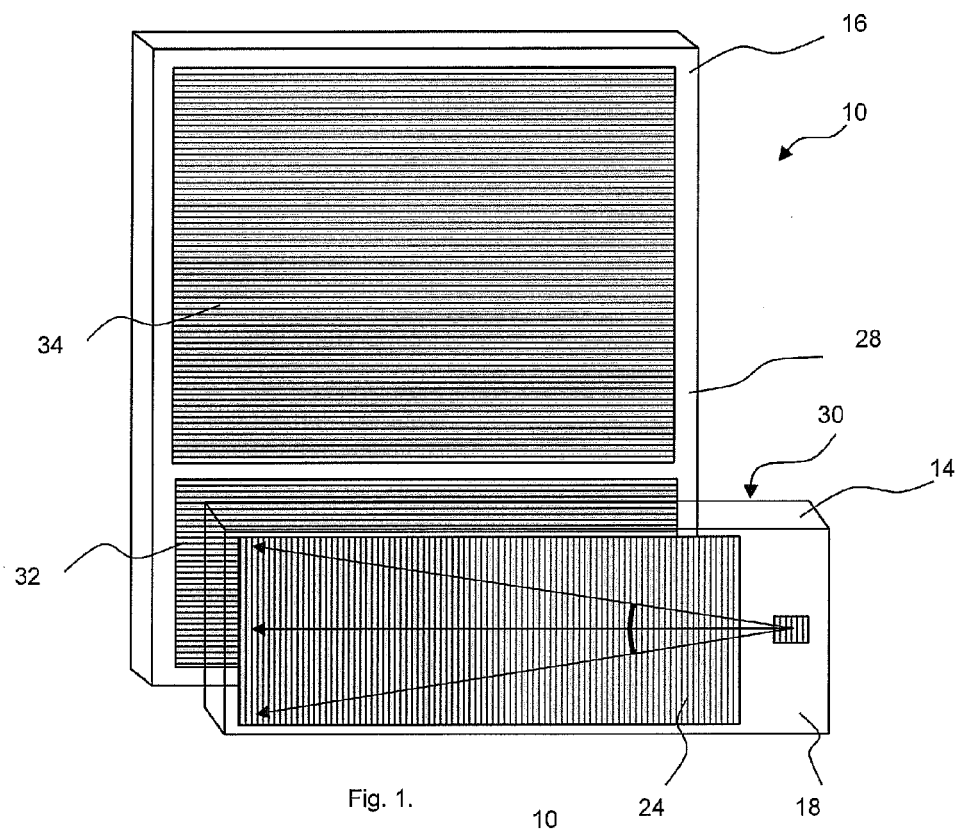
FIG. 1 illustrates, in perspective view, a prior art projection display including parallel waveguides.
Figure 2:
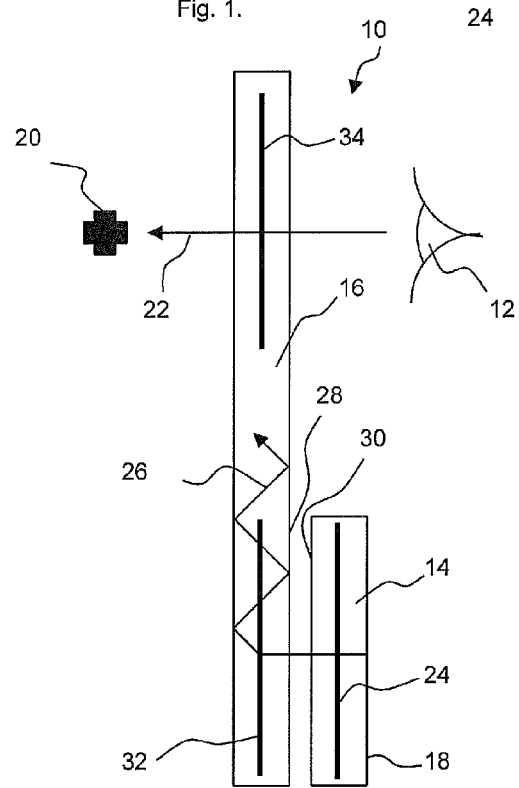
FIG. 2 illustrates, in elevation view, the prior art projection display of FIG. 1.
Figure 3:
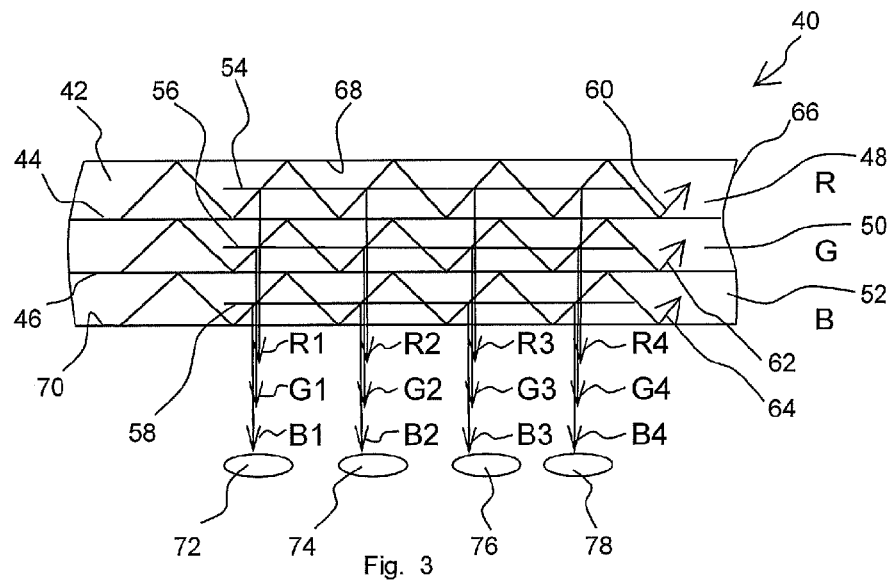
FIG. 3 illustrates, in elevation view, a waveguide apparatus according to the present invention.

Referring to FIG. 3, a waveguide apparatus 40 includes a substrate of material 42 having first and second layers 44 and 46 arranged within the substrate of material 42 so as to define separate first, second and third channels 48, 50 and 52. The first and second layers can be formed from a thin film dielectric coating. The channels, 48, 50, 52 are arranged to transmit light in respective predefined wavelengths or wavelength ranges within the channel 48, 50, 52 under total internal reflection. The first channel 48 is arranged to transmit light in a first wavelength range and in this example, the first channel transmits light in a red wavelength range of image bearing light R (e.g. in the range between about 590 to 750 nm). The second channel 50 is arranged to transmit light in a second wavelength range and in this example, the second channel transmits light in a green wavelength range of image bearing light G (e.g. in the range between about 495 and 590 nm). The third channel 52 is arranged to transmit light in a third predetermined wavelength range and in this example, the third channel transmits light in a blue wavelength range of image bearing light B (e.g. in the range between about 380 and 495 nm).

The channels may be provided with coatings for ensuring that light in the predefined wavelengths remain within the respective channels until they interact with an output grating 54, 56, 58. In this regard, each channel 48, 50, 52 has a grating 54, 56, 58 within the channel 48, 50, 52 that is arranged to diffract a portion of image bearing light incident thereon out of the substrate of material 42 and to allow the remainder of the image bearing light incident thereon to be transmitted in its respective channel 48, 50, 52 under total internal reflection. Image bearing light passing through the grating 54, 56, 58 continues along a light path 60, 62, 64 towards a distal end 66 of the substrate of material 42 to further interact with the grating 54, 56, 58 associate with the channel 48, 50, 52.

Accordingly, for channel 48, the red wavelengths of image bearing light R follow light path 60 under total internal reflection between a first face 68 of the substrate of material 42 and the first layer 44. The image bearing light interacts with the grating 54, such that a portion R1, R2, R3, R4 is diffracted out of the substrate of material 42 upon each interaction. Similarly, for channel 50, the green wavelengths of image bearing light G follow light path 62 under total internal reflection between the first layer 44 and the second layer 46. The image bearing light interacts with the grating 56, such that a portion G1, G2, G3, G4 is diffracted out of the substrate of material 42 upon each interaction. Again, for channel 52, the blue wavelengths of image bearing light B follow the light path 64 under total internal reflection between the second layer 46 and second face 70 of the substrate of material 42. The image bearing light interacts with the grating 58, such that a portion B1, B2, B3, B4 is diffracted out of the substrate of material 42 upon each interaction. In this manner, a number of pupils of image bearing light 72, 74, 76, 78 are formed by the red, green and blue outputs from the substrate of material 42, that is pupil 72 is formed from R1, G1 and B1, pupil 74 is formed from R2, G2 and B2, pupil 76 is formed from R3, G3 and B3 and pupil 78 is formed from R4, G4 and B4. It will be understood that the pupils of image bearing light 72, 74, 76, 78 when viewed by an observer, not shown, will convey an image to the observer. It will be appreciated that the arrangement provides a single combiner in the form of the substrate for the image bearing light in separate wavelengths.

Figure 4:
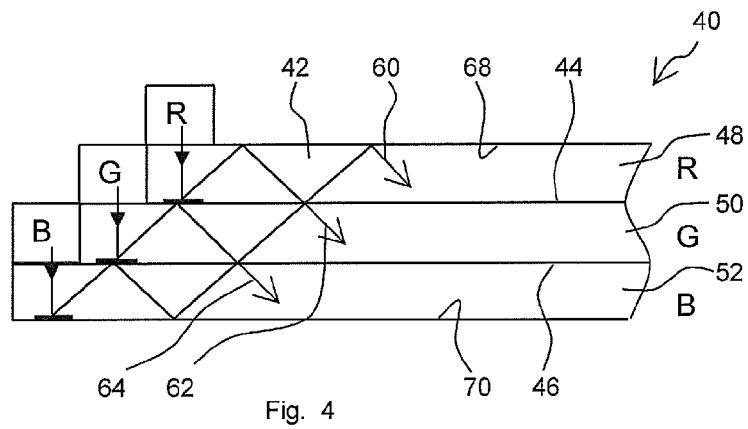
FIG. 4 illustrates, in elevation view, a first embodiment of image bearing light injection into the waveguide apparatus of the present invention.

Referring to FIG. 4, wherein like references have been used to indicate similar integers to those described with reference to FIG. 3, image bearing light is injected into the substrate of material 42 via separate optical elements for each channel 48, 50, 52. That is, the red, green and blue wavelengths of image bearing light R, G, B, are separated prior to injection into the appropriate channel 48, 50, 52 of the substrate of material 42. In this example, the red, green and blue wavelengths may be within relatively narrow ranges and selected in order to reproduce an image of the required colour in the final viewed image. The red wavelengths of image bearing light R enter the first channel 48 via a reflective element 80 and follow light path 60 between first face 68 of the substrate of material 42 and the first layer 44. The green wavelengths of image bearing light G enter the second channel 50 via a reflective element 82 and follow light path 62 between first layer 44 and second layer 46. The blue wavelengths of image bearing light B enter the third channel 52 via a reflective element 84 and follow light path 64 between the second layer 46 and the second face 70 of the substrate of material 42.

Figure 5:
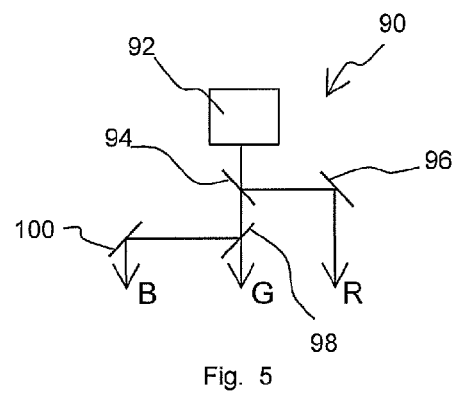
FIG. 5 illustrates, in schematic, an apparatus to separate image bearing light into red, green and blue wavelengths.

Referring to FIG. 5, there is illustrated an apparatus 90 to separate an image to be conveyed to an observer, not shown, into red, green and blue wavelengths of image bearing light. A suitable image-providing light source device 92 is arranged to inject image bearing light into the apparatus 90. The image bearing light is split or filtered to provide a red channel R by a first optical element 94. The image bearing light associated with the red channel R is then reflected by a suitable mirror 96 to allow injection into the waveguide apparatus, for example 40 of FIG. 4. The green and blue components of the image bearing light pass through the first optical element 94 and is split or filtered to provide separate green and blue channels G, B by a second optical element 98. The image bearing light associated with the green channel G passes through the second optical element 98 and the image bearing light associated with the blue channel B is reflected by a suitable mirror 100 to allow injection into the waveguide apparatus 40.

Figure 6:
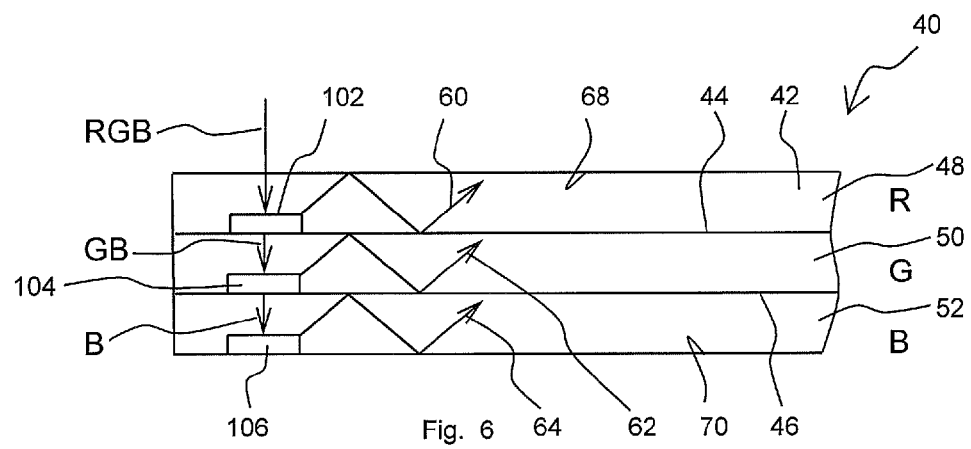
FIG. 6 illustrates, in elevation view, an alternative embodiment of image bearing light injection into the waveguide apparatus of the present invention.

Referring to FIG. 6, wherein like references have been used to indicate similar integers to those described with reference to FIG. 3, alternatively image bearing light is injected into the substrate of material 42 via a single point. The red, green and blue wavelengths of image bearing light are separated by optical elements associated with each channel as the image bearing light passes into the channel 48, 50, 52. The red, green and blue wavelengths of image bearing light R, G, B enter the first channel 48 and are filtered or split by a first optical element 102 such that the green and blue wavelengths of image bearing light G, B pass through the first optical element 102 into the second channel 50, whilst the red wavelengths of image bearing light R follow light path 60 between first face 68 of the substrate of material 42 and the first layer 44. The green and blue wavelengths of image bearing light G,B enter the second channel 50 and are filtered or split by a second optical element 104 such that the blue wavelengths of image bearing light B pass through the second optical element 104 into the third channel 52, whilst the green wavelengths of image bearing light G follow light path 62 between first layer 44 and second layer 46. The blue wavelengths of image bearing light B enter the third channel 52 and are reflected by a third optical element 106 such that the blue wavelengths of image bearing light B follow light path 64 between the second layer 46 and the second face 70 of the substrate of material 42.

It will be understood that the injection of image bearing light into a waveguide element 40 can be via one or more reflective, transmissive or refractive optical elements. Furthermore, the grating elements 54, 56, 58 can be reflective, thereby being arranged on or near an internal surface of a channel 48, 50, 52 or transmissive, thereby being arranged towards the centre of the channel 48, 50, 52.

Figure 7:
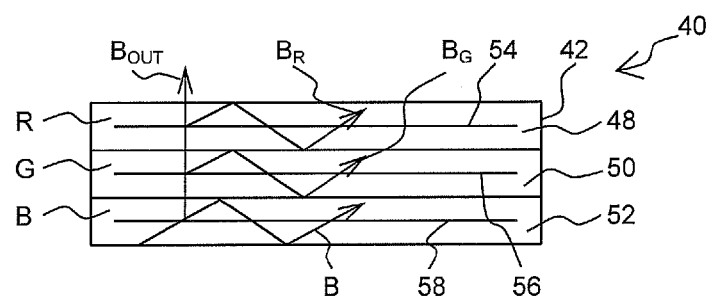
FIG. 7 illustrates, in elevation view, cross-talk between channels of a waveguide apparatus of the present invention.

Referring to FIG. 7, wherein like references have been used to indicate similar integers to those described with reference to FIG. 3, a substrate of material 42 having three channels 48, 50, 52 can have a crosstalk component associated with each of the wavelengths of image bearing light required to pass through a channel 48, 50, 52 and its associated grating 54, 56, 58 which is arranged to transmit another wavelength of image bearing light. In this case, blue wavelengths of image bearing light $B_{OUT}$ will have to cross second channel 50, its associated grating 56, first channel 48 and its associated grating 54 to exit the substrate of material 42. Likewise, the green wavelengths of image bearing light G will have to cross the first channel 48 and its associated grating 54 to exit the substrate of material 42. Crosstalk can be caused by unwanted interaction of image bearing with the grating 54, 56, 58 of another channel 48, 50, 52. Considering the blue wavelengths of image bearing light B, if the grating 58 is arranged to diffract seven percent (7%) of incident image bearing light out of the channel 52, as indicated by reference $B_{OUT}$, and five percent (5%) of image bearing light diffracted out of the channel 52 couples into an adjacent channel 48, 50 due to crosstalk, as indicated by the references $B_R$ and $B_G$, then only five percent of seven percent (0.35%) of the blue wavelengths of image bearing light will couple into either the red or green channels 48, 50. This small amount of crosstalk should not affect the performance of the waveguide apparatus 40 and can be ignored.

Figure 8:
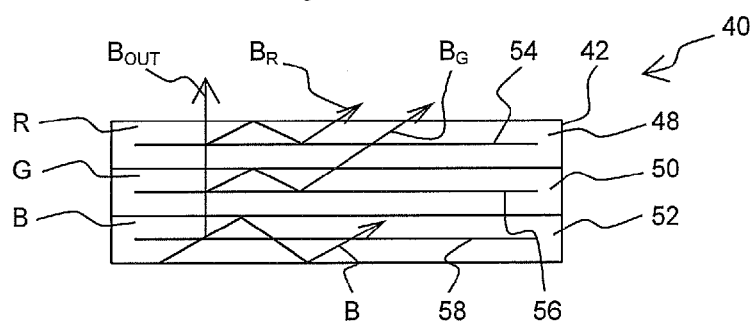
FIG. 8 illustrates, in elevation view, cross-talk between channels of a waveguide apparatus of the present invention.

Alternatively, referring to FIG. 8, wherein like references have been used to indicate similar integers to those described with reference to FIGS. 3 and 7, it will be understood that a grating 54, 56, 58 can be optimised such that if image bearing light from another channel is coupled into a channel 48, 50, 52, then the grating 54, 56, 58 will diffract light from another channel off axis to the primary axis of the waveguide apparatus 40, as indicated by reference $B_{OUT}$. Considering, the blue wavelengths of image bearing light B, if the gratings 54 and 56 of the first and second channels 48 and 50 are arranged to diffract blue wavelengths of image bearing light B off axis to the primary axis $B_{OUT}$ of the waveguide apparatus 40, as indicated by the references $B_R$ and $B_G$, then an observer, not shown, will not perceive such off axis blue wavelengths of image bearing light $B_R$ and $B_G$.

Figure 9:
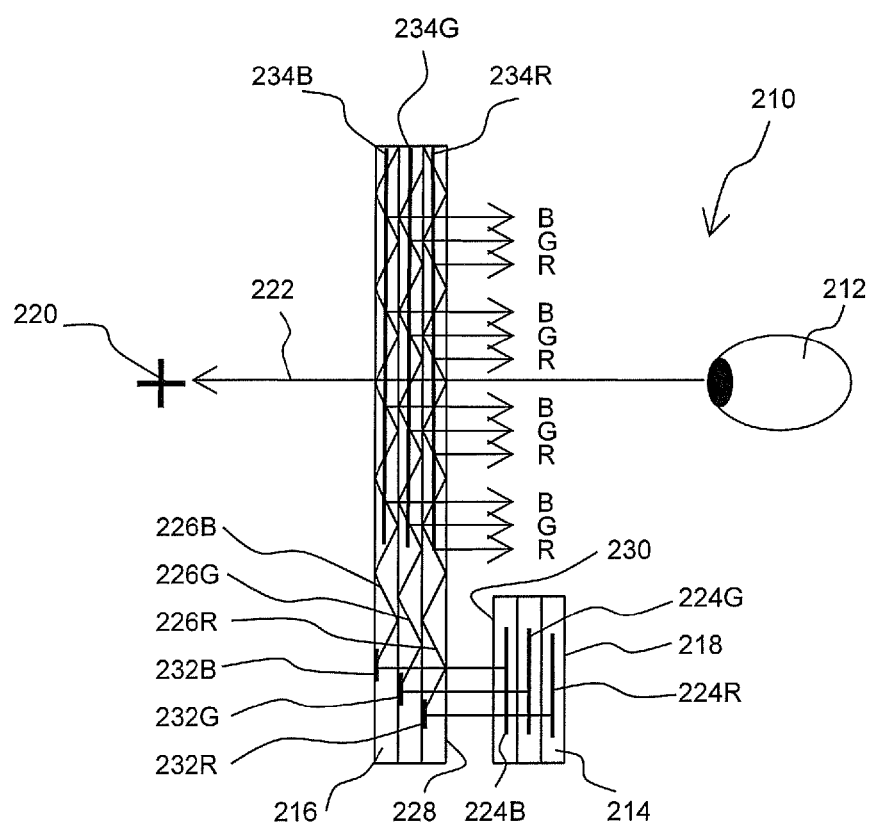
FIG. 9 illustrates, in perspective view, projection display including parallel waveguides according to the present invention.

Referring to FIG. 9, a projection display 210 for displaying an image to an observer 212 that uses waveguide techniques to generate a display defining a large exit pupil at the point of the observer 212 and a large field of view, whilst using a small image-providing light source device. The projection display 210 uses a first plate-like waveguide 214 made of light transmissive material such as glass or plastic and a second plate-like waveguide 216 made from a light transmissive and light transparent material such as glass or plastic. The projection display 210 additionally includes an image-providing light source device, not shown, located to inject image bearing light into the first plate-like waveguide 214 through a first face 218.

The image-providing light source device includes a micro-display arranged to provide information to be displayed to the observer 212. Additionally the image-providing light source device may include a collimating optical arrangement located between the micro-display and the first face 218 of the first plate-like waveguide 214. If used, the collimating optical arrangement is operable to collimate light received from the micro-display and to inject the collimated image bearing light into the first plate-like waveguide 214 through the first face 218.

Image bearing light produced by the image-providing light source device has a small exit pupil and is fed into the first plate-like waveguide 214, which performs the function of stretching the horizontal pupil of the final display. The output from the first plate-like waveguide 214 is fed into the second plate-like waveguide 216, which is arranged to stretch the vertical pupil of the final display and also to act as a combiner for the projection display 210 through which the observer 212 views an outside world scene 220 along a line of sight 222 of the observer 212 through the second plate-like waveguide 216 with information to be displayed to the observer 212 overlaid on the outside world scene 220. In this manner, the image to be displayed to the observer 12 looking through the second plate-like waveguide 216 defines a large exit pupil and a large field of view whilst using a small image generating light source.

It will be understood, as previously explained with reference to FIGS. 3 to 8, the image bearing light is comprised of three wavelengths, red, green and blue and each of these wavelengths is substantially isolated from one another throughout its passage through the projection display 210 in individual channels as indicated by referenced R, G and B. Image bearing light injected into the first plate-like waveguide 214, via first face 218 is incident on one of three first grating 224R, 224G, 224B, each arranged internally within the first plate-like waveguide 214 and substantially parallel with the first face 218 and one each associated with an individual channel R, G, B. Light impinging on the first gratings 224R, 224G, 224B diffracts therefrom such that the incidence angle of the light on the internal surfaces of channel R, G, B is greater than the critical angle for the material from which the channel R, G, B is formed. The image bearing light is constrained within the channel R, G, B to propagate along the first plate-like waveguide 214 reflecting from each internal surface in turn to follow a predefined light path 226R, 226G, 226B. Thus, the relative field angles of the light incident on the first plate-like waveguide 214 at the first face 218 are preserved within each channel R, G, B and the information required to regenerate the original image is preserved.

The first gratings 224R, 224G, 224B also serve to radiate the image bearing light out of the first plate-like waveguide 214. Each first grating 224 is a low efficiency grating which diffracts a small amount of light out of the first plate-like waveguide 214 on each interaction with incident image bearing light.

The second plate-like waveguide 216 is located with a first face 228 parallel with a second face 230 of the first plate-like waveguide 214 and is arranged to receive the image bearing light exiting the second face 230 from each channel R, G, B of the first plate-like waveguide 214. The second face 230 is parallel to the first face 218 of the first plate-like waveguide 214. The first face 228 of the second plate-like waveguide 216 is located adjacent and close to the second face 230 of the first plate-like waveguide 214. The second plate-like waveguide 216 includes separate channels R, G, B each having a second grating 232R, 232G, 232B located therein arranged substantially parallel to the first face 228 of the second plate-like waveguide 216 and each second grating 232R, 232G, 232B is operable to diffract impinging image bearing light received from an associated first grating 224R, 224G, 224B of the first plate-like waveguide 214 at an angle that is larger than the critical angle for the material from which the channel R, G, B is formed. Accordingly, received image bearing light will propagate inside one of the channels R, G, B of the second plate-like waveguide 216 to follow the predefined light path 226R, 226G, 226B. The image bearing light continues along the light path 226R, 226G, 226B to a third grating 234R, 234G, 234B arranged within each channel R, G, B of the second plate-like waveguide 216 which is arranged to diffract the received image bearing light out of the second plate-like waveguide 216 towards the observer 212.

Each second grating 232R, 232G, 232B is arranged such that its diffractive power is rotated through 90 degrees to that of the diffractive power of its associated parallel first grating 224R, 224G, 224B to rotate incident image bearing light towards its associated third grating 234R, 234G, 234B.

Each third grating 234R, 234G, 234B is a low efficiency grating, such that as image bearing light propagates along a light path 226R, 226G, 226B within a channel R, G, B of the second plate-like waveguide 216, each interaction with the third grating 234R, 234G, 234B causes a small proportion of the image bearing light to be diffracted out of the second plate-like waveguide 216. Image bearing light which is not diffracted out of the second plate-like waveguide 216 continues to propagate within its channel R, G, B within the second plate-like waveguide 216. Accordingly, a large number of parallel rays of image bearing light exit the second plate-like waveguide 216 via one of the third gratings 234R, 234G, 234B towards the observer 212, which originated at discrete points on the micro-display forming the image generating light source device. As the relative field angles of the image bearing light have been preserved within the first and second plate-like waveguides 214, 216, the correct image to be conveyed to the observer 212 is presented for viewing when the observer 212 views an outside world scene 220 through the second plate-like waveguide 216.

The invention claimed is:

1. A waveguide apparatus, comprising:
   a substrate of light transmissive material;
   at least one layer arranged within the substrate of material, the layer being arranged to define separate channels within the substrate of material, each channel configured to transmit light of different predefined wavelengths under total internal reflection; and
   a grating associated with each channel, wherein each grating is arranged to diffract a portion of light incident thereon out of the substrate of material and to allow the remainder of the light incident thereon to be transmitted in its associated channel under total internal reflection.

2. A waveguide apparatus, as claimed in claim 1, wherein two layers are arranged within the substrate of material to define three separate channels, and wherein a first channel is arranged to carry light in a red wavelength, a second channel is arranged to arranged to carry light in a green wavelength and a third channel is arranged to carry light in a blue wavelength.

3. A waveguide apparatus, as claimed in claim 1, wherein at least one filter is arranged to separate light dependent on wavelength prior to transmission within a channel.

4. A waveguide apparatus, as claimed in claim 3, wherein at least one filter is carried on or within the substrate of material.

5. A waveguide apparatus, as claimed in claim 1, wherein light is separated dependent on wavelength prior to injection into the substrate of material.

6. A waveguide apparatus, as claimed in claim 1, wherein each grating is arranged to diffract light out of the substrate of material, and wherein the light is substantially parallel with light diffracted out of the substrate of material by each other grating within another channel.

7. A waveguide apparatus, as claimed in claim 1, wherein the channels have respective optical elements for injecting image bearing light into the channels, and wherein the optical elements are configured for injecting image bearing light only within respective said predefined wavelengths into the channels and allowing image bearing light outside of those respective predefined wavelengths to pass therethrough.

8. A waveguide apparatus, as claimed in claim 1, wherein the grating is a holographic optical element.

9. A projection display, for displaying an image to an observer, comprising:
   a first waveguide element arranged to be light transmissive;
   an image-providing light source device arranged to generate an image and to inject image bearing light into the first waveguide element;
   the first waveguide element being arranged to direct the image bearing light internally along the first waveguide element and through which the image bearing light is outputted from the first waveguide element;
   a second waveguide element arranged to be light transmissive and transparent and is arranged to receive the image bearing light from the first waveguide element and to direct the image bearing light along the second waveguide element;
   the second waveguide element is further arranged to output image bearing light from the second waveguide element towards an observer; and
   wherein the first waveguide element includes a substrate of material having at least one layer arranged within the substrate of material, the layer being arranged to define separate channels within the substrate of material, each channel configured to transmit light in different predefined wavelengths and a first grating associated with each channel, wherein each first grating is arranged to diffract a portion of light incident thereon out of the substrate of material and to allow the remainder of the light incident thereon to be transmitted in its associated channel under total internal reflection;
   wherein the second waveguide element includes a substrate of material having at least one layer arranged within the substrate of material, the layer being arranged to define separate channels within the substrate of material, each channel configured to transmit light in different predefined wavelengths under total internal reflection and a second grating associated with each channel, wherein each second grating is arranged to diffract light incident thereon to be transmitted in its associated channel under total internal reflection; and
   wherein the second waveguide element also includes a third grating associated with each channel, wherein each third grating is arranged to diffract a portion of light incident thereon out of the substrate of material towards the observer and to allow the remainder of the light incident thereon to be transmitted in its associated channel under total internal reflection.

10. A projection display, as claimed in claim 9, wherein the first waveguide element is plate-like, the second waveguide element is plate-like and the first and second waveguide elements are arranged substantially parallel to one another.

11. A projection display, as claimed in claim 9, wherein the first waveguide element and the second waveguide element are arranged substantially in the same plane.

12. A projection display, as claimed in claim 11, wherein the first waveguide element and the second waveguide element are formed within a single piece of material.

13. A projection display, as claimed in claim 9, wherein the first waveguide element is rod-like, the second waveguide element is plate-like and the first and second waveguide elements are arranged such the image bearing light exits the first waveguide element along a longitudinal axis of the first waveguide element and enters the second waveguide element to propagate along a propagation axis of the second waveguide element.

14. A Head Up Display, or Helmet Mounted Display, or Head Mounted Display including a projection display as claimed in claim 9.

15. A Head Up Display, or Helmet Mounted Display, or Head Mounted Display including a waveguide apparatus as claimed in claim 9.

* * * * *